(12) United States Patent
Aisa et al.

(10) Patent No.: US 8,248,057 B2
(45) Date of Patent: Aug. 21, 2012

(54) METHOD FOR MEASURING THE MAINS FREQUENCY, AND ELECTRICAL APPLIANCE THAT IMPLEMENTS SAID METHOD

(75) Inventors: Valerio Aisa, Fabriano (IT); Enrico Smargiassi, Jesi (IT)

(73) Assignee: Indesit Company S.p.A., Fabriano (IT)

( * ) Notice: Subject to any disclaimer, the term of this patent is extended or adjusted under 35 U.S.C. 154(b) by 491 days.

(21) Appl. No.: 12/522,411

(22) PCT Filed: Jan. 10, 2008

(86) PCT No.: PCT/IB2008/000105
§ 371 (c)(1),
(2), (4) Date: Jul. 8, 2009

(87) PCT Pub. No.: WO2008/084398
PCT Pub. Date: Jul. 17, 2008

(65) Prior Publication Data
US 2010/0060258 A1    Mar. 11, 2010

(30) Foreign Application Priority Data

Jan. 11, 2007 (IT) ............................. TO2007A0016

(51) Int. Cl.
*G01R 23/02* (2006.01)
*G01R 23/00* (2006.01)

(52) U.S. Cl. ..................................... 324/76.39; 702/75

(58) Field of Classification Search ............... 324/76.39, 324/76.11; 702/75, 76, 85, 106, 72
See application file for complete search history.

(56) References Cited

U.S. PATENT DOCUMENTS

| 4,150,432 | A | 4/1979 | Sorden |
| 4,317,049 | A | 2/1982 | Schweppe |
| 4,319,329 | A * | 3/1982 | Girgis et al. ..................... 702/75 |
| 6,338,009 | B1 * | 1/2002 | Sato et al. ...................... 700/286 |
| 2001/0048290 | A1 * | 12/2001 | Underwood et al. ........... 322/20 |
| 2006/0235574 | A1 * | 10/2006 | Lapinski et al. ............... 700/286 |

FOREIGN PATENT DOCUMENTS

| GB | 2426878 | 8/2007 |
| JP | 2007259682 A * | 10/2007 |
| JP | 2008178215 A * | 7/2008 |

* cited by examiner

*Primary Examiner* — Hoai-An D Nguyen
(74) *Attorney, Agent, or Firm* — Cesari and McKenna, LLP (57) ABSTRACT

A method for measuring the mains frequency by a digital control system of an electrical appliance, in particular an electrical household appliance, in which the digital control system is prearranged for performing rigorous measurements of the value of the mains frequency and of its variations through an operation of calibration of the means for measurement of the mains frequency performed prior to marketing of the product.

22 Claims, 7 Drawing Sheets

METHOD FOR MEASURING THE MAINS FREQUENCY, AND ELECTRICAL APPLIANCE THAT IMPLEMENTS SAID METHOD

FIELD OF THE INVENTION

The present invention relates to a method for measuring the mains frequency and to an electrical appliance that implements said method. Forming the subject of the present invention are also a method for the dynamic control of the electrical-power demand by an electrical appliance and a process for prearranging an electronic device for measuring the frequency of an a.c. voltage.

The invention has been developed with particular attention being paid to the theme of control of the consumption of electrical energy by electrical appliances, in particular electrical household appliances, aimed at guaranteeing as much as possible a dynamic balancing between the amount of electrical energy produced upstream by the generators that supply a given system for distribution of electrical energy and the amount used downstream by the set of all the electrical appliances supplied by said distribution system.

BACKGROUND ART

It is known that the condition of maximum efficiency of a system for distribution of electrical energy is achieved when the power generated and introduced into the corresponding distribution network is equivalent to the one effectively absorbed by the set of the electrical appliances connected to the mains, namely, when the total amount of electrical power generated is in equilibrium with the total amount of power absorbed. Situations of inefficiency emerge, instead, when there exists a imbalance between the power generated and the one effectively required by the totality of the appliances connected to a given network for distribution of electrical energy.

In the case where, in a given instant, the power demand is significantly lower than the power produced, it is necessary, in order to Prevent any waste, to reduce the production of electrical energy through, for example, the reduction of the power delivered or the de-activation of one or more generators. Instead, when at a given instant the power demand tends to exceed the power effectively introduced into a given distribution network, then it is necessary, in order to prevent the risk of collapse of the mains supply (black-out), to set in operation one or more supplementary generators or, if these are already active with reduced power, to increase the power delivered in order to guarantee a condition of substantial re-balance between the power produced and the power absorbed.

Since the operations for de-activation and, above all, the operations for activation of supplementary generators of electrical energy produce inefficiencies and result on an annual basis, with reference, for example, to a country such as Great Britain or Italy, in an increase in the management costs of tens of millions of pounds or euros and in an increase of millions of tons of $CO_2$ introduced into the atmosphere, it is very important to seek to promote development of techniques designed to minimize the sudden fluctuations of total absorption of electrical power by the ensemble of the appliances connected to a given network for distribution of electrical energy.

An interesting technique for minimizing sudden fluctuations of absorption of electrical power is described in U.S. Pat. No. 4,317,049 and is based upon the concept of "Dynamic Demand Control" (DDC), i.e., upon the dynamic control of the power demand performed directly and automatically by the appliances themselves. According to said technique, a set of electrical appliances, connected to a given distribution network, can modify the corresponding power consumption, within given limits and without jeopardizing their own functionality, in order to minimize sudden variations of the total absorption of electrical power by said distribution network, in accordance with the effective conditions of load of the latter, detected through the measurement of the corresponding mains frequency. It is known, in fact, that the value of the mains frequency constitutes a reliable indicator of the condition of load of a given network for distribution of electrical energy. In particular, when the consumption of the totality of the appliances tends to exceed the amount of electrical power that can be supplied by the mains, the frequency tends to drop with respect to its nominal value (typically equal to 50 or 60 Hz) by a few hundredths of Hertz, according to a known law; and, instead, when the power consumption is lower than the mains potential, the frequency tends to increase in a similar way with respect to its nominal value. The aforesaid solution envisages, hence, appropriate reduction of the power absorptions of the individual electrical appliances when the mains frequency decreases by a given quantity with respect to its nominal value, and appropriate increase of said absorptions when the mains frequency tends to exceed its own nominal value.

The fact that the totality of a significant set of electrical appliances is able to monitor, instant by instant, the possible variations of the mains frequency with respect to its nominal value and is able to react in the same instant to said variations, guarantees that said operations of reduction or increase of power absorption will occur in a perfectly synchronous way and hence such as to produce, by superposition of the effects, the desired corrective action.

The technique described in U.S. Pat. No. 4,317,049 moreover envisages that the control system of each electrical appliance is able to vary the power absorption associated to the corresponding internal electrical loads, without jeopardizing proper functionality of the appliance, i.e., without penalizing the quality of the performance offered to the user.

The electrical appliances most suited to perform the DDC function are the ones that are able to delay or anticipate their own absorption of electrical power without jeopardizing their own functionality for the benefit of the user. Possible non-exhaustive examples of said electrical appliances are air-conditioning systems, boilers, and household cooling appliances (refrigerators and freezers). The cooling appliances, in particular, represent the most interesting products, by virtue of their extremely wide diffusion. Other examples can be represented by electrical household appliances of discontinuous use (such as washing machines, dish-washers, and dryers, distinguished by phases of heating with high current absorption) that are able to delay according to the need, in relation to the state of overloading of the electrical mains, the step of heating of water or air, increasing the duration of the operating cycle but guaranteeing the same quality of the final performance.

The practical application of the aforesaid technique, regarding the minimization of possible sudden fluctuations of the total power absorption of a given network for distribution of electrical energy, presupposes the connection to said network of a sufficiently high number of electrical appliances capable of self-regulating their own consumption on the basis of the value of the mains frequency. In actual fact, however, there currently exist problems that prevent diffusion on a large scale of electrical appliances, in particular electrical household appliances, that are provided by this important feature, so that the applicability of the DDC function still proves rather remote. The main problems that constitute an obstacle to diffusion of electrical appliances, in particular electrical household appliances, capable of self-regulating their own consumption in accordance with the value of the mains frequency, are substantially the following two:

1. non-negligible cost of the DDC function (estimated at around 2-3 euros), which can be supported only by high-range products, the volumes of which are, however, insufficient for ensuring an effective action of compensation (proper, precisely, to the DDC function) in regard to sudden variations of the total power absorbed by the set of all the appliances connected to a given network for distribution of electrical energy;

2. current lack of incentives by national governments and/or by companies producing and distributing electrical energy, aimed at redistributing, given the marked economic and environmental benefit deriving from an efficient system of dynamic demand, part of said benefits in favour of manufacturers of electrical appliances provided with the DDC function and the corresponding purchasers and users.

It is evident that, a solution of the latter problem creates premises that are important for favouring the solution to the former problem.

In this connection, of considerable importance is the positive action currently performed by the British government, which, in order to stimulate the production and purchase of electrical household appliances (in particular refrigerators) that incorporate the DDC function, has recently promulgated a law that creates the conditions for the definition of appropriate instruments of incentivization in the use of "dynamic-demand technologies". This is the so-called "HL Bill 106" of May 12, 2006, entitled *Climate Change and Sustainable Energy Bill*", which, amongst the various actions envisaged, also includes, through Art. 18, production, within twelve months from entry into force of the law itself, of a document that describes quantitatively the benefits, in terms of reduction of emissions of gases noxious for the environment, deriving from the use of DDC technologies.

SUMMARY OF THE INVENTION

The purpose of the present invention is to solve the first problem mentioned, regarding the cost associated to the introduction of the DDC function within the control system of an electrical appliance, in particular of an electrical household appliance.

Said purpose is achieved, according to the present invention, through a method for measuring the frequency of an a.c. voltage and/or an electrical appliance and/or a method for the dynamic control of the electrical-power demand by an electrical appliance and/or a process for prearranging an electronic device to measuring the frequency of an a.c. voltage having the characteristics indicated in the annexed claims. The claims form an integral part of the technical teaching provided herein in relation to the invention.

As will emerge clearly hereinafter, the invention enables, for any digital control system of electrical appliances, in particular of electrical household appliances, implementation of the DDC function without any need to introduce additional costs. In other words, thanks to the present invention, the digital control system of an electrical appliance is able to perform rigorous measurements of the value of the mains frequency and of its variations, in accordance with the DDC function, without the need to have available high-precision, and hence costly, measuring means.

The above is obtained, according to the invention, through an operation of calibration of the means for measurement of the mains frequency, which belong to the digital control system of the electrical appliance, preferably prior to marketing of the product, with the aid of an external measurement instrument, which performs the role of standard instrument, featuring a precision or resolution of measurement suited to the purpose of the present invention.

BRIEF DESCRIPTION OF THE DRAWINGS

The innovative contents of the present invention and the advantages associated thereto will emerge more clearly from the ensuing detailed description and from the annexed drawings, which are provided purely by way of non-limiting example and in which.

DESCRIPTION OF PREFERRED
EMBODIMENTS OF THE INVENTION

Figure 1A:
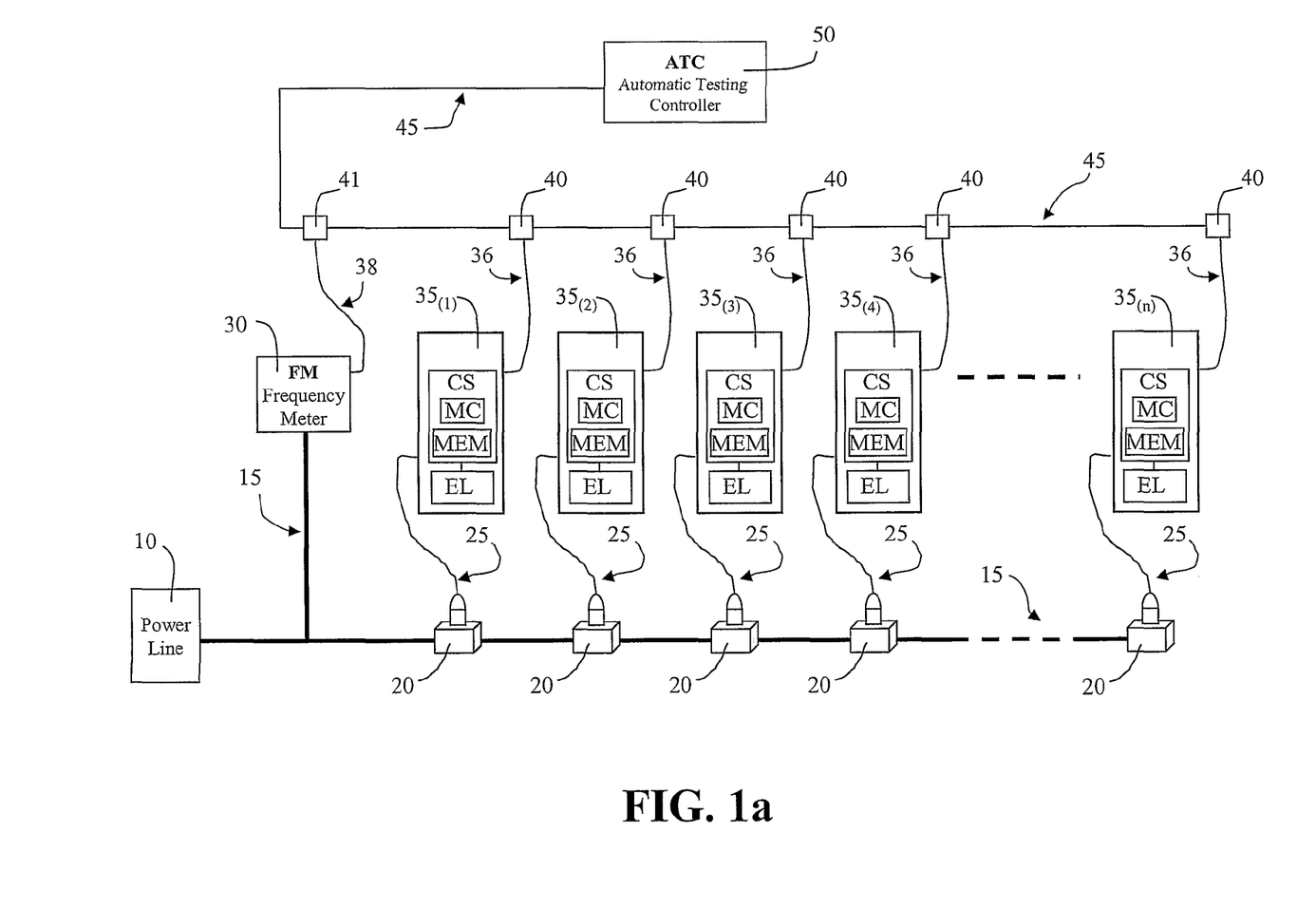
FIG. 1*a* is a simplified block diagram that illustrates a testing system of electrical household appliances, which implements a process for pre-arranging the control system of the electrical appliances to the measurement of the mains frequency, according to the present invention.

FIG. 1*a* represents a block diagram of an end-of-line testing system for one or more electrical appliances 35, each having respective electrical loads, designated by EL, according to the invention. Said testing system is managed by a central controller 50, which, through an appropriate software, controls the various steps of testing of the "n" electrical appliances 35, which are electrically supplied through the corresponding supply cable 25, which is connected, by means of a respective current socket 20, to the a.c. mains voltage 15 supplied by a supply block 10. The central controller 50 is able to exchange digital information, through a digital communication network 45, with the digital control systems CS of the individual appliances 35, which are connected to the network 45 by means of a corresponding serial cable 36, through a communication node 40. The central controller 50 is moreover able to communicate through the same digital network 45 with a standard (sampling) device 30, designed for rigorous measurement of the mains frequency, i.e., distinguished by an accuracy compatible with the one required by the DDC (Dynamic Demand Control) function. The standard device 30 is connected to the network 45 by means of the serial line 38, through an appropriate communication node 41. The communication network 45 can be any digital network, of a wired or else wireless (for example, radiofrequency) type using any communication protocol. Likewise, the serial communication line 36 associated to each appliance 35 and the serial line 38 for the frequency meter 30 can be represented by any digital serial line, of a wired or else wireless type using any communication protocol. The interface between each of said serial lines 36 and 38 and the digital network 45 is created, respectively, through communication nodes 40 and 41, of a conception in itself known. The control systems CS of the individual electrical appliances 35, which comprise at least one microcontroller MC and non-volatile memory means MEM, are pre-arranged, according to the invention, for obtaining the value of the mains frequency through the measurement of the corresponding period. The control systems CS are moreover designed for varying the power absorption of one or more electrical loads EL of the respective appliance 35, without jeopardizing proper functionality of the latter, i.e., without penalizing the quality of the performance offered to the user (for example, according to what is described in U.S. Pat. No. 4,317,049).

Figure 1B:
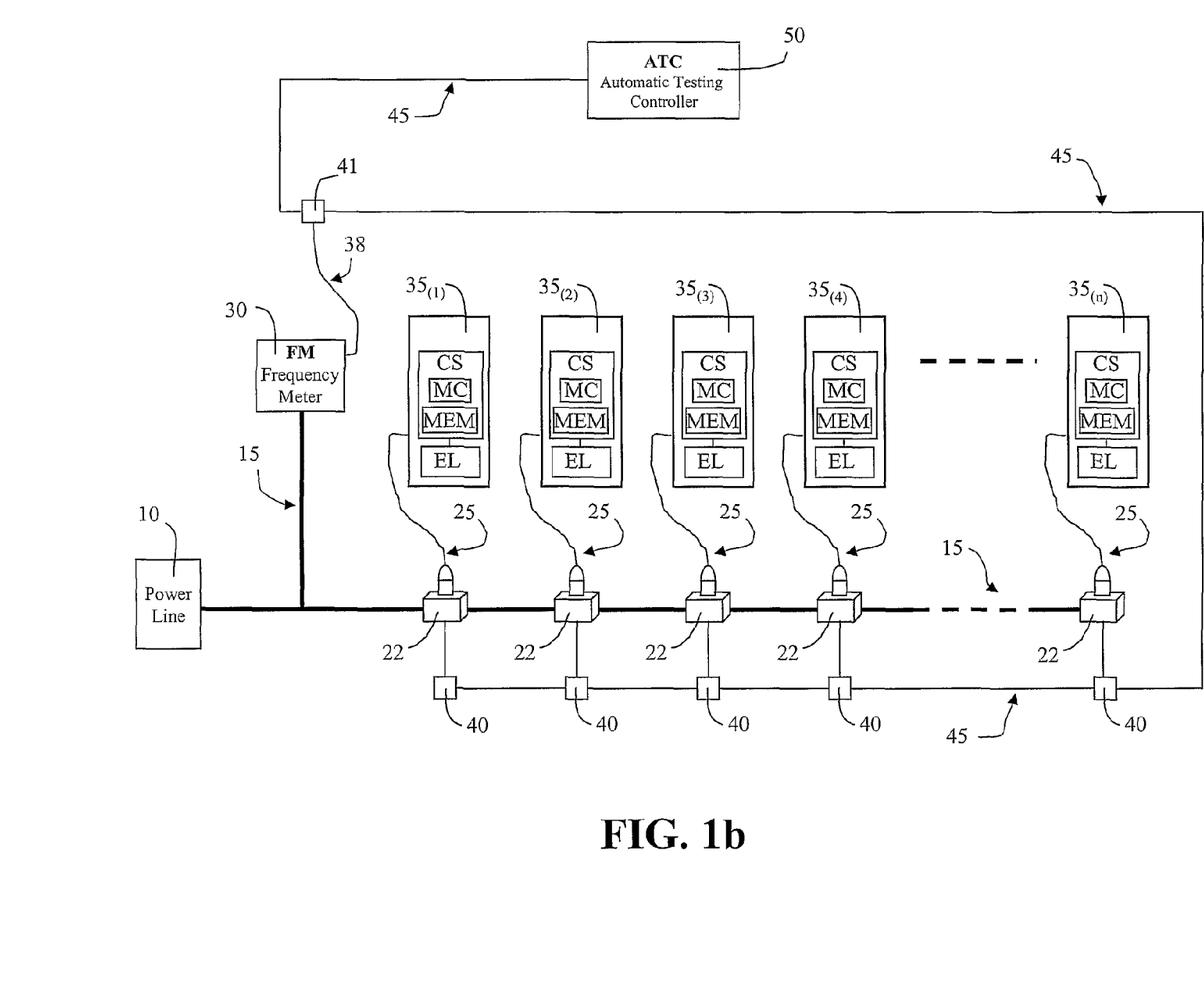
FIG. 1*b* is a schematic representation of a possible variant of the testing system represented in FIG. 1*a*.

Represented in FIG. 1b is a variant of the block diagram of FIG. 1a, in which the exchange of information between each of the electrical appliances 35 and the central controller 50 does not occur by means of a serial line, but through the supply cable 25 itself of the electrical appliances, using the communication technique referred to as "power modulation", described, for example, in the international patent application WO 02/21664 and in the article "*Connecting white goods to a home network at a very low cost*", Aisa et al., International Appliance Manufacturing, 2004. The aforementioned documents describe a particular narrow-band communication system based upon "power line", rendered extremely economically advantageous by the fact that it employs the same resources as the ones used by the digital control system of the electrical household appliances 35 to exchange information, via the supply cable 25 of the product, with an external adapter 22 set between said supply cable and a standard current socket. This communication technique is particularly suitable in the case where the electrical appliance 35 is of an economical type and is not provided with a serial line, but in any case requires exchange of information with the outside world.

Figure 1C:
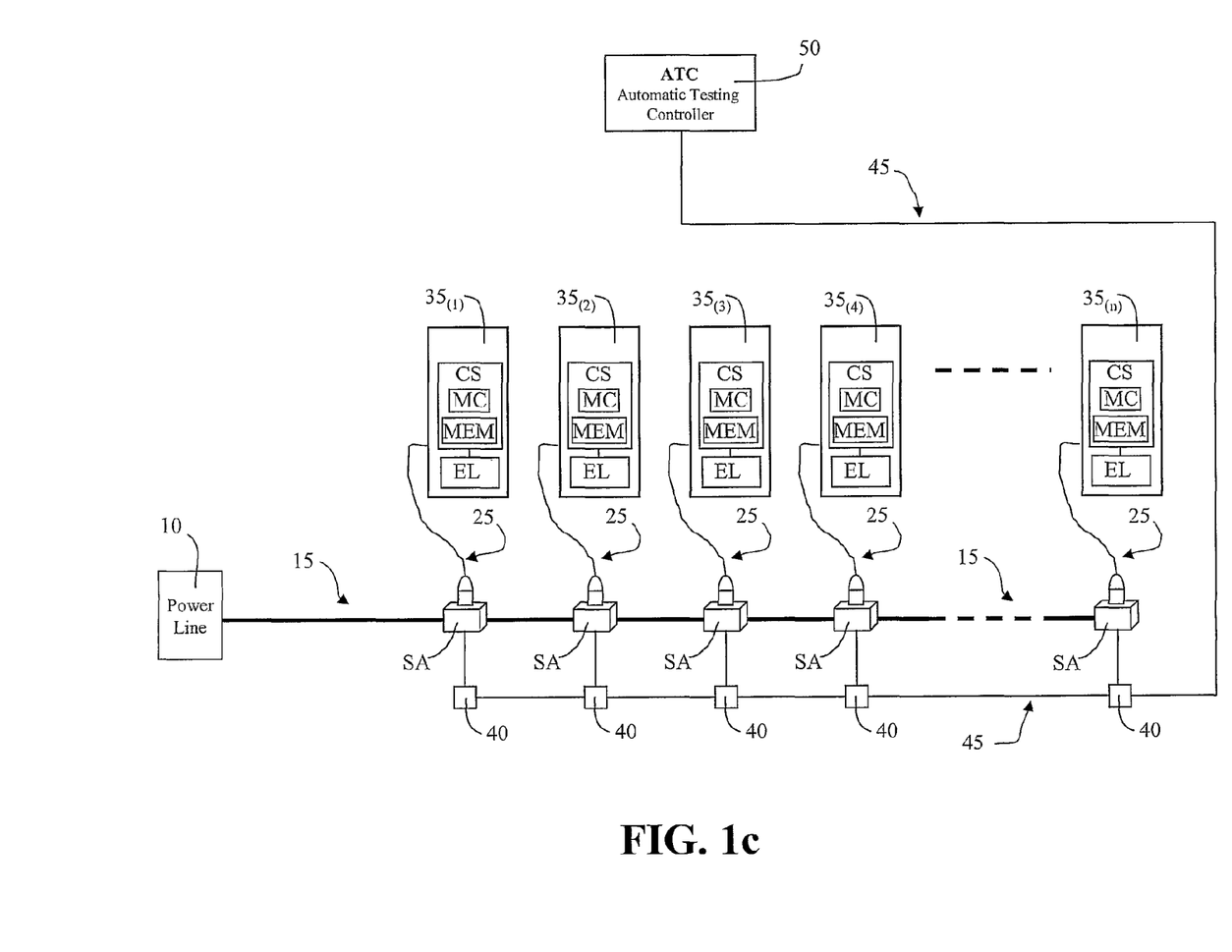
FIG. 1*c* is a schematic representation of a further, particularly advantageous, variant of the testing system represented in FIG. 1*b*.

An advantageous variant with respect to the block diagram of FIG. 1b is represented in FIG. 1c where, according to the invention, the function of measurement associated to the standard device 30 is performed by each of the external adapters designated by SA ("Smart Adapters"), which, for the purpose, are equipped with appropriate measurement means, distinguished by an accuracy compatible with the one required by the DDC function. In this case, the presence of the standard measurement device 30 is no longer necessary, and the calibration process of the digital control system of each electrical appliance is performed locally and occurs in a way totally independent of that of the other electrical appliances 35, the calibration system being as a whole more robust.

Figure 2:
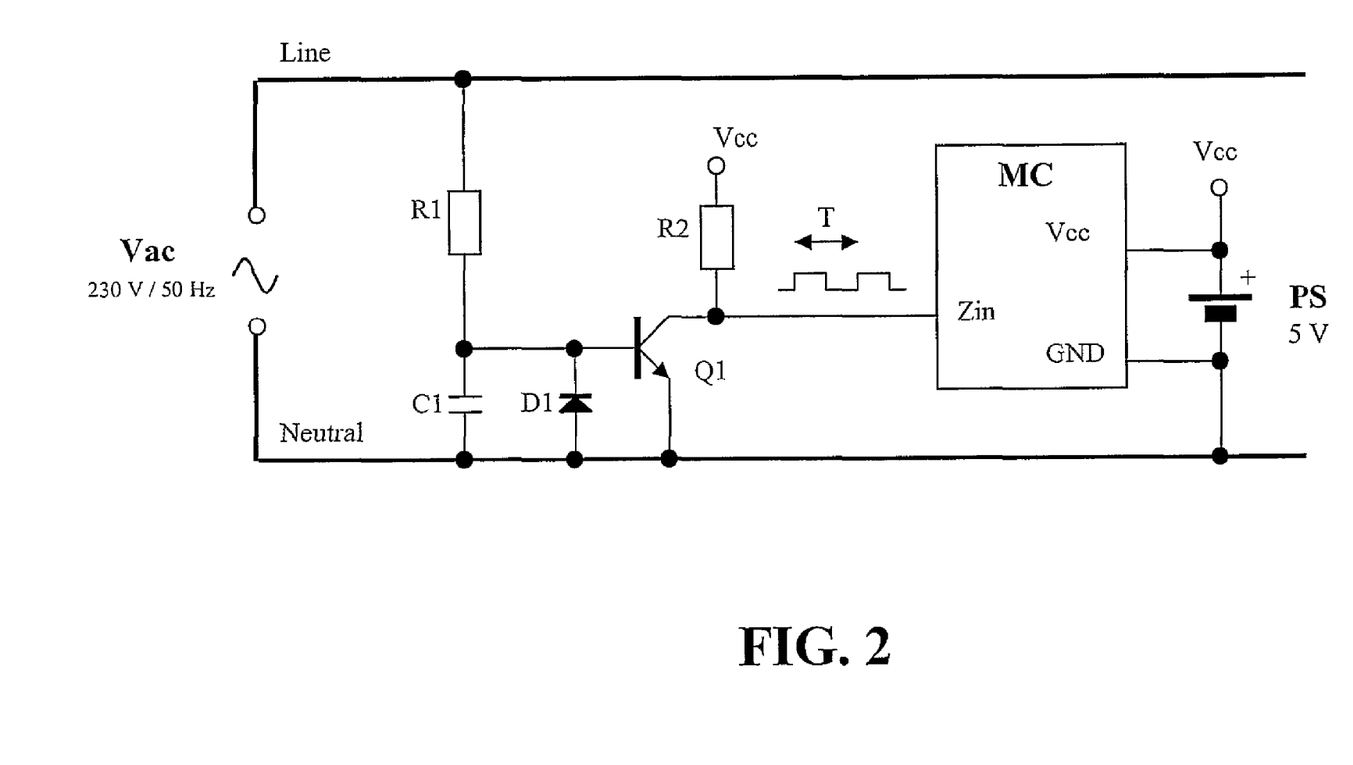
FIG. 2 is a schematic representation of an example of circuit that can be used, by the digital control system of an electrical appliance according to the invention, for detecting the zero crossings of the a.c. mains voltage.

FIG. 2 represents, purely by way of non-limiting example, one of the many possible circuits suitable for detecting the zero crossings of the a.c. mains voltage Vac, necessary for performing the measurement of the mains period and, hence, also of the mains frequency deriving therefrom. Said circuit can be used, according to the invention, by the digital control system CS of each electrical appliance 35 for detecting the zero crossings of the a.c. mains voltage through any microcontroller MC, supplied through the d.c. voltage Vcc (by way of non-limiting example we assume Vcc=5 V), generated by a power supply PS. For this purpose, the a.c. mains voltage Vac, which, once again by way of non-limiting example, we assume as having a nominal value of 230 V and a frequency of 50 Hz, is applied through the resistor R1 (the ohmic value of which must be sufficiently high so as to limit the current to the minimum) to the base of the transistor Q1, appropriately protected in regard to the reverse mains voltage (negative half-wave) by means of the diode D1 and in regard to possible electrical disturbance by means of the capacitor C1, to obtain across the collector thereof, thanks to the pull-up resistor R2, a square wave the frequency of which coincides exactly with the mains frequency. Said square wave is applied to the digital input Zin of the microcontroller MC, which, through an appropriate internal counter, measures the time interval that elapses between a given edge (for example the positive one, as indicated in the figure) of said square wave and the corresponding edge of the immediately subsequent square wave, thus calculating the period T of the mains voltage, from which there can easily be obtained the value of the mains frequency f, given that f=1/T. Given this biunique relation, which links the value of the mains period to the frequency, reference will be made hereinafter indifferently to measurement of the mains period and to measurement of the mains frequency, it being understood that the mains frequency is obtained, in the embodiment exemplified herein, through a rigorous measurement of the mains period. In the case where the mains frequency is exactly 50 Hz, i.e., f=50,00 Hz, the value of the period T is exactly 20 ms, i.e., 20000 µs. assuming that is it is desired to perform the measurement of the mains frequency with a precision of one hundredth of a hertz, i.e., f=50±0.01 Hz, the corresponding measurement of the mains period would be T=20000±4 µs, which means that the measurement of the time by the microcontroller MC would have to be performed with a maximum error of ±4 µS. To obtain such a high level of precision, it is necessary for the oscillator of the microcontroller MC, which supplies the time base, to be very precise and stable in time, a requirement that can be obtained only using good-quality quartz oscillators, characterized by high precision and high stability as the temperature and the supply voltage vary. The cost of oscillators of this type is not, however, always compatible, as has already been mentioned, with the constraints of cost proper to certain sectors, such as that of electrical household appliances, and their use can be associated only to high-range products.

As has been said, the specific purpose of the present invention is to enable the measurement of the mains period, and hence of the mains frequency, by the digital control system CS of an electrical appliance 35, in particular of an electrical household appliance, wherein said digital control system is able to perform rigorous measurements of the value of the mains period, and hence of the mains frequency, adequate for performing the DDC function effectively, but without any need to have available high-precision, and hence costly, measuring means.

This is made possible, according to the invention, through an operation of calibration of the means for measurement of the mains period, and hence also of the mains frequency, associated to the digital control system CS of the electrical appliance 35, performed once and for all, preferably at the moment of functional testing of the product, at the end of the assembly line, or else during functional testing of the electronics alone of the digital control system of said product, at the moment of the final step of assembly thereof.

Through the aforesaid operation of calibration, it is possible to reduce effectively, i.e., render negligible in relation to the application, the systematic errors present in the measurement process, said errors depending upon the goodness or accuracy of the devices and of the instruments (physical or logic, i.e., of a hardware or else software type) used for the measurement itself.

In the specific case of the present invention, the measurement of the mains period (and hence also of the frequency) by the digital control system CS of electrical household appliances 35 is subject to systematic errors basically due to:

- tolerance of the electronic components that constitute the circuit network for detection of the physical signal (example of the circuit represented in FIG. 2);
- logic (software) used for acquiring the measurement: for example, measurement performed by the microcontroller MC through interrupt procedures, or else via the aid of an internal timer provided with the function of automatic event capture, or else by means of techniques of polling of the input signal;
- accuracy of the system clock with which to generate the time unit of measurement.

If we designate as $t_i$ the measurement of a time performed by the digital control system of an electrical appliance 35 (FIGS. 1a, 1b, 1c), corresponding to the absolute quantity $\tau_i$, then, to a first approximation, we can indicate the relation between the two values as $$t_i = a + b\tau_i + \epsilon_i \quad (1)$$

where a and b are, respectively, the additive component and proportional component of the total systematic error, and $\epsilon_i$ is the random error that determines the imprecision of the measurement itself, the statistical distribution of which is, in the case forming the specific subject of the present invention, of a normal type (gaussian curve).

Since the measurement of frequency on which the present invention is based basically consists in the measurement of a time interval (mains period) of the type $$T = t_i - t_j,$$

the additive component a disappears and, in the range of validity of relation (1), we have:

$$T = t_i - t_j = b(\tau_i - \tau_j) + 2\epsilon$$

where $\epsilon$ is the random error, which, given that it is of the same type for the two measurements, is assumed as being twice as much (most unfavourable case). This indicates clearly that the proportional component b of the systematic error, which we shall call correction factor, is the one that contributes essentially to the accuracy of the measurement T and hence of the frequency f=1/T, given that the random error $\epsilon$ can be completely zeroed, by virtue of its statistical distribution of a normal type, if there is assumed as result of the measurement the average of the measurements of N consecutive mains periods.

The calibration must, consequently, have the purpose of supplying the value of the correction factor b in such a way that the digital control system of the electrical appliance 35 will be able to correct its measurement of the period T, with respect to the corresponding certain value $\tau_i - \tau_j$, i.e., $T \approx b(\tau_i - \tau_j)$, whence $\tau_i - \tau_j \approx T/b$ and, substituting $T=1/f$, we obtain $$\tau_i - \tau_j \approx 1/(bf) \rightarrow bf \approx 1/(\tau_i - \tau_j) \rightarrow v \approx bf$$

where $v=1/(\tau_i - \tau_j)$ is the certain value of the frequency.

Since the calibration in question is made by a frequency meter 30 the accuracy of which is to be considered suitable for the purpose, i.e., such that the corresponding correction factor $b_{FM}$ is approximately equal to 1 ($b_{FM} \approx 1$), the corrective factor b for the electrical appliance 35 can be given simply by the comparison between the value measured by the frequency meter 30 (i.e., the period $T_{FM}$) and what is measured by the appliance 35 itself (i.e., the period T):

$$T_{FM} \approx b_{FM}(\tau_i - \tau_j)$$

but, since $b_{FM} \approx 1$, we have $T_{FM} \approx (\tau_i - \tau_j) \approx T/b$ whence, since $T=1/f$ and $T_{FM}=1/f_{FM}$, it follows that $$b \approx (T/T_{FM}) = f_{FM}/f \quad (2)$$

Since each individual measurement T or $T_{FM}$ is subject to the imprecision due to the random errors (where the ones corresponding to the measurement T are certainly higher than the ones corresponding to the measurement $T_{FM}$ performed by the standard instrument 30), also the factor b, given as ratio between measurements, will be subject to random errors. Hence, in order to eliminate the random errors, it is preferable to apply the averaging operation on the measurements T and $T_{FM}$ before performing the ratio. In fact, since the errors are random errors with normal distribution, said averaging operation cancels out the contribution itself of the random error (zero mean).

Consequently, the calibration factor b, which represents the basic calibration parameter according to the invention, can be determined through the following ratio:

$$b = T_{mean}/T_{FMmean}$$

where $T_{mean}$ and $T_{FMmean}$ are, respectively, the mean values of T and $T_{FM}$, to which there correspond the respective mean values of the frequency $f_{mean}$ and $f_{FMmean}$ (obviously, the ratio could be reversed, i.e., $b=T_{FMmean}/T_{mean}$).

For the calculation of the average, it is necessary to establish the number of samples N on which to perform the average, i.e., the number of consecutive mains periods to be considered. Said number must guarantee that the residual error, over the average $T_{mean}$ used for the calibration, is clearly lower than the error associated to the measurement T used in the application.

In particular, if we consider as index of the random error the standard deviation of the sample of measurements and if the application is likely to use control algorithms on the basis of measurements that are also averages of T, performed on n samples, which we will designate here as $\overline{T}_n$, then its standard deviation, $\sigma_{\overline{T}_n}$ is linked to the deviation of the individual measurement, $\sigma_T$, by the relation $$\sigma_{\overline{T}_n} = \frac{\sigma_T}{\sqrt{n}} \quad (3)$$

The calibration procedure, which performs an average on N samples, will hence yield as standard deviation $$\sigma_{\overline{T}} = \frac{\sigma_T}{\sqrt{N}} = \sigma_{\overline{T}_n}\sqrt{\frac{n}{N}} \quad (4)$$
$$\uparrow$$
$$\text{from (3)}$$

Consequently, since we wish to have $$\sigma_{\overline{T}} < \sigma_{\overline{T}_n} \text{ then } \sqrt{\frac{n}{N}} < 1$$

If, purely by way of quantitative non-limiting example, there were to be adopted, as criterion for estimation of N, the fact that the calibration should yield a contribution lower than ⅓ of the error associated to the measurement, we must have $$\sqrt{\frac{n}{N}} < \frac{1}{3} \Rightarrow N > 9n$$

i.e., the number of samples on which to perform the calibration is at least equal to nine times the number of samples used for application purposes.

Preferably, another factor to be taken into account in evaluating the number N, is the presence or otherwise of an evident trend (i.e., an evolution not linked to random factors) of the mains frequency during the calibration step, for example a tendency to decrease or else increase. In this case, where a non-random evolution of the mains frequency (due, for example, to the conditions of load of the mains at a given moment) is present, it is necessary to increase the number N considerably in order to compensate for the error associated to said trend.

Consequently, the calibration process according to the present invention is preferably based upon the following criteria:

i) the calibration parameter to be adopted and applied to all the measurements of the mains period (or frequency) as multiplicative factor is:

$$b = T_{mean}/T_{FMmean} = f_{FMmean}/f_{mean}$$

where the averaging operation for $T_{mean}$ and $T_{FMmean}$ (i.e., to $f_{FMmean}$ and $f_{mean}$) is performed on N samples, associated to N consecutive mains periods;

ii) the number of samples N on which calibration is to be performed must guarantee that the error associated to $T_{mean}$ (designated in the subsequent formulas with the equivalent symbol $\overline{T}$) is markedly lower than the error associated to the measurement used by the control system of the electrical appliance 35 in applying of its own control algorithms; if the latter measurement is the average of the period on n samples (and for clarity, we designate it by $\overline{T_n}$), and we take as error index the standard deviation, then we have:

$$\sigma_T < \sigma_{T_n} \sqrt{\frac{n}{N}} \text{ with } \sigma_T < \sigma_{T_n} \text{ i.e., } \sqrt{\frac{n}{N}} < 1$$

whence, if the criterion of choice is $$\frac{\sigma_T}{\sigma_{T_n}} = \frac{1}{\alpha} \text{ with } \alpha > 1,$$

it follows that the number N of samples must be at least $N = \alpha^2 n$;

iii) the number N should be increased considerably as compared to the estimation performed at point ii) if, in calibration step, the measurement of the period (or frequency) were to present a significant trend, i.e., a non-negligible variation, of a non-random type, deriving, for example, from the state of overload of the mains at that moment.

Figure 3A:
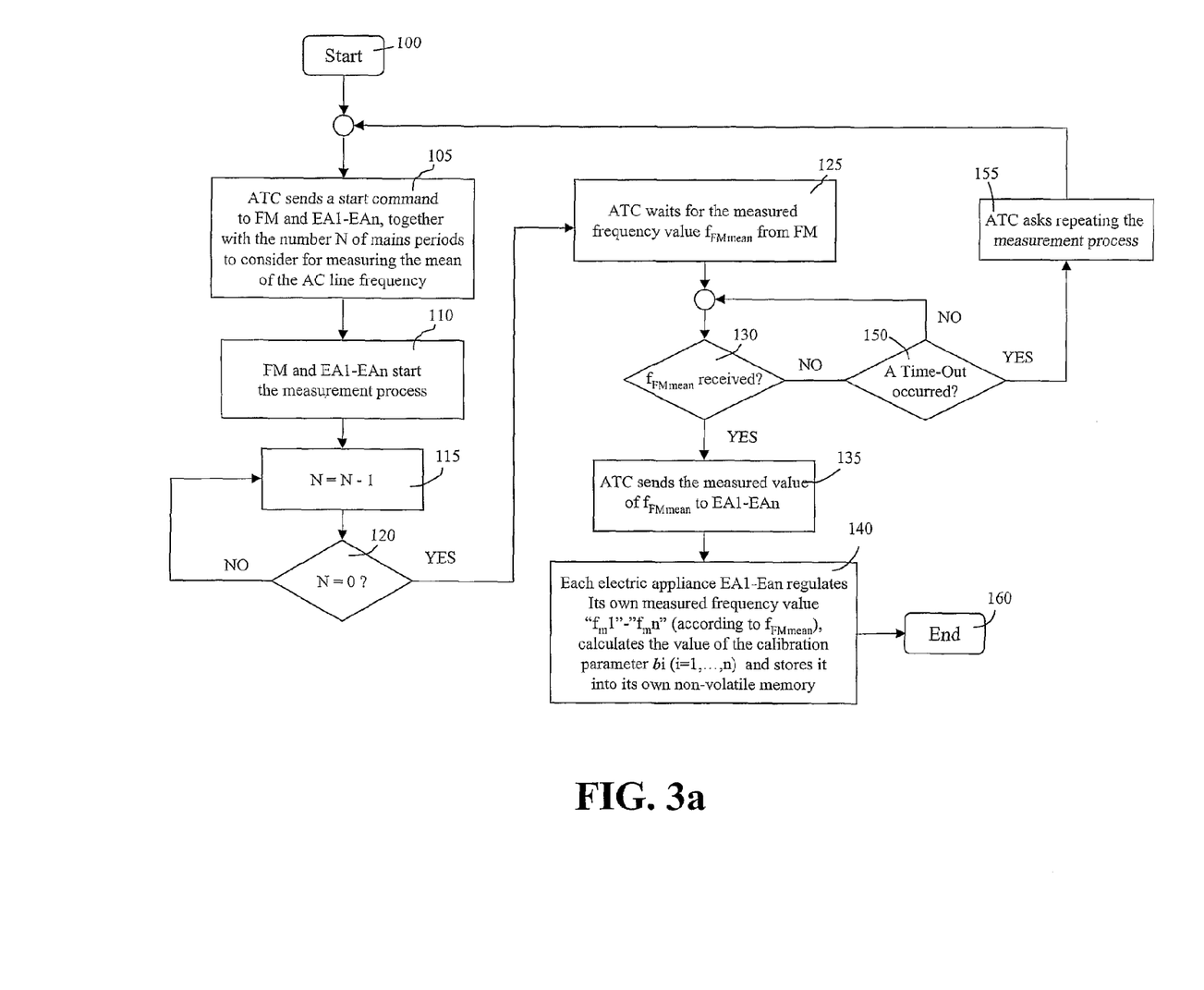
FIG. 3*a* is a flowchart that describes a first mode of application of the aforesaid process according to the present invention.

The aforesaid calibration process (which, as has already been said, can be applied at the moment of functional testing at the end of the assembly line of the electrical appliance 35, or else during the functional testing of the electronics alone of the digital control system of said electrical appliance 35) is schematically described by the flowchart of FIG. 3a, which refers, purely by way of non-limiting example, to the case of the end-of-line testing of one or more electrical appliances 35.

In FIG. 3a, Block 100 indicates the instant of start of the process of calibration of the means for measurement of the mains period, and hence of the mains frequency, associated to the digital control system of each electrical appliance 35, according to the invention. Block 100 passes the control to Block 105, where the central controller 50, here designated by the acronym ATC (Automatic Testing Controller), sends a starting command, i.e., a command for start of measurement of the mains period, and hence of the mains frequency, to the standard measurement device 30, represented by a high-precision device for measuring the mains period/frequency and here referred to by the acronym FM (Frequency Meter), and to the control systems CS of the electrical appliances 35, here designated by the acronyms EA1 (Electric Appliance "1") ... EAn (Electric Appliance "n"), and, at the same time, sends also the number of the periods of the mains voltage N that must be considered to perform the measurement of the mains period/frequency. Block 105 then passes the control to Block 110, where the standard measurement device FM (30) and the control systems of the electrical appliances EA1-EAn ($35_{(a)}$-$35_{(n)}$) start, synchronously, the process of measurement of the mean value of the mains period, and hence of the mains frequency, referred to the time interval defined by the value of N, and control passes to Block 115.

In said block and in the next block 120, the controller ATC (50) waits for the N periods of the mains voltage envisaged to elapse and then passes the control to Block 125. Assuming, purely by way of non-limiting example, that N is 50 and that the nominal value of the mains frequency is equal to 50 Hz, the time interval $T_N$ during which the mean value of the mains frequency is to be calculated by the standard frequency meter FM (30) and the electrical appliances EA1-EAn ($35_{(a)}$-$35_{(n)}$) would be 1 second ($T_N$=N*T=50*20 msec=1000 msec=1 sec). In this case, the control system of the standard device 30 carries out rigorous measurement of the time $T_N$ corresponding to the aforesaid 50 consecutive periods of the mains voltage and then determines the mean value $T_{mean}$ ($T_{mean}=T_N/N=T_N/50$) of the mains period, from which, through the known relation $f_{mean}=1/T_{mean}$, the mean value $f_{mean}$ of the mains frequency is obtained. Parallel to and synchronously with the standard device 30, also the control systems CS of the electrical appliances EA1-EAn ($35_{(a)}$-$35_{(n)}$) each carry out their measurement of the mains mean period, and hence of the mains mean frequency, corresponding to the interval $T_N$. In Block 125, the controller ATC (50) waits to receive, from the control system of the standard measurement device FM (30), the value just measured of the mains mean frequency $f_{FMmean}$, calculated with reference to the time interval $T_N$, and simultaneously verifies, through the test block 130, whether said value has in actual fact been sent.

If it has not been sent, the controller ATC (50) verifies, through Block 150, whether a given time limit (time-out) has elapsed, after which it is necessary to pass the control to Block 155, since an evident malfunctioning has occurred in the operations of measurement performed by the standard device FM (30), and the controller ATC (50) requests a repetition of the process of measurement of the mains frequency. Instead, in the case where the value $f_{FMmean}$ has been regularly received, control passes to Block 135, where the controller ATC (50) sends the aforesaid value $f_{FMmean}$, received from the standard measurement device FM (30), to each of the control systems CS of the electrical appliances EA1-EAn ($35_{(a)}$-$35_{(n)}$), which, through Block 140, perform the operation of calibration of their own means of measurement of the mains frequency. Said operation of calibration is made through the comparison between the mean value of the mains frequency $f_{FMmean}$ rigorously determined by the standard measurement device FM (30) designed for said purpose according to the invention, and the mean frequency values ($f_m1, f_m2, \ldots, f_mn$) obtained by each of the digital control systems CS of the electrical appliances EA1-EAn ($35_{(a)}$-$35_{(n)}$). During the operation of calibration, each control system CS of the electrical appliances determines its own calibration parameter b and stores it within its own nonvolatile memory MEM.

Once said operation is completed, control finally passes to the final block 160. From this moment on, the control system CS of each electrical appliance EA1-EAn ($35_{(a)}$-$35_{(n)}$) will be able, through the use of the corresponding calibration parameter b according to the invention, to set to zero the systematic errors deriving from the imprecision of its own measurement means and to implement the DDC function without the need to use costly measurement means.

In particular, during normal operation of each electrical appliance 35 at the user's premises, the corresponding control system CS uses the value of b, stored in its own nonvolatile memory MEM, in order to correct the measurement of the mains frequency on the basis of the formula: $f_{adjusted} = f_{measured}*b$, where $f_{adjusted}$ is the frequency value free from systematic errors used for the purposes associated to the DDC function according to the invention.

Figure 3B:
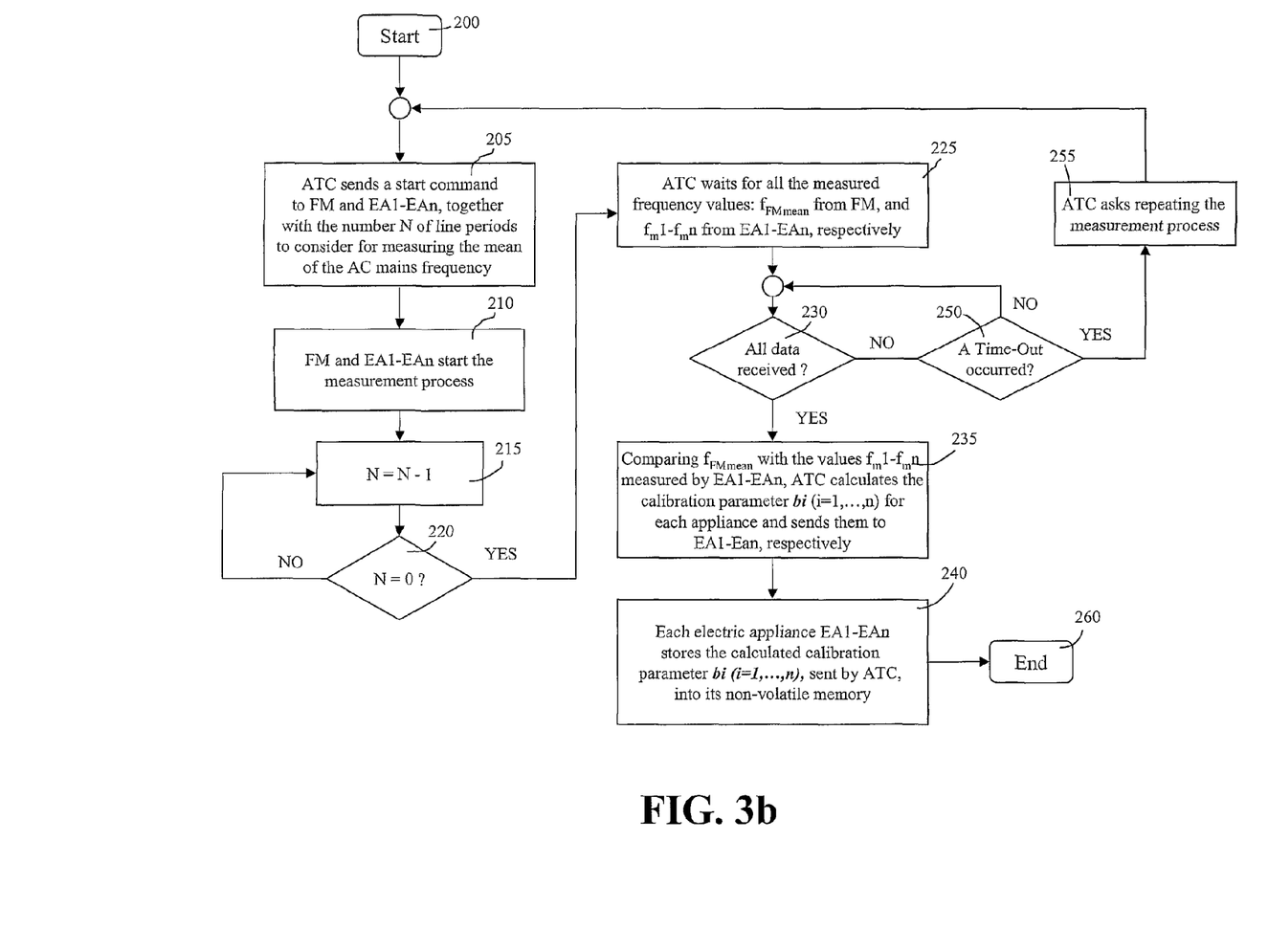
FIG. 3*b* is a flowchart that describes a second mode of application of the aforesaid process according to the present invention.

A possible variant of the calibration process according to the invention, described by the flowchart of FIG. 3a, is represented in FIG. 3b and consists in operating in such a way that it is the central controller ATC (50) itself that performs the calculation of the calibration coefficient b for each electrical appliance EA1-EAn, through the comparison of the mean frequency values $f_m1$-$f_m2$- ... -$f_mn$, supplied by the control systems CS of said electrical appliances, with the mean frequency value $f_{FMmean}$, calculated in a preciseq way by the measurement device FM (30). In this case, once the controller ATC (50) has completed the operation of calculation of the values of the calibration parameters of the various electrical appliances EA1-EAn ($35_{(a)}$-$35_{(n)}$), it sends each of said values to the respective control system CS of each of said electrical appliances, which stores it within its own nonvolatile memory MEM.

Figure 3C:
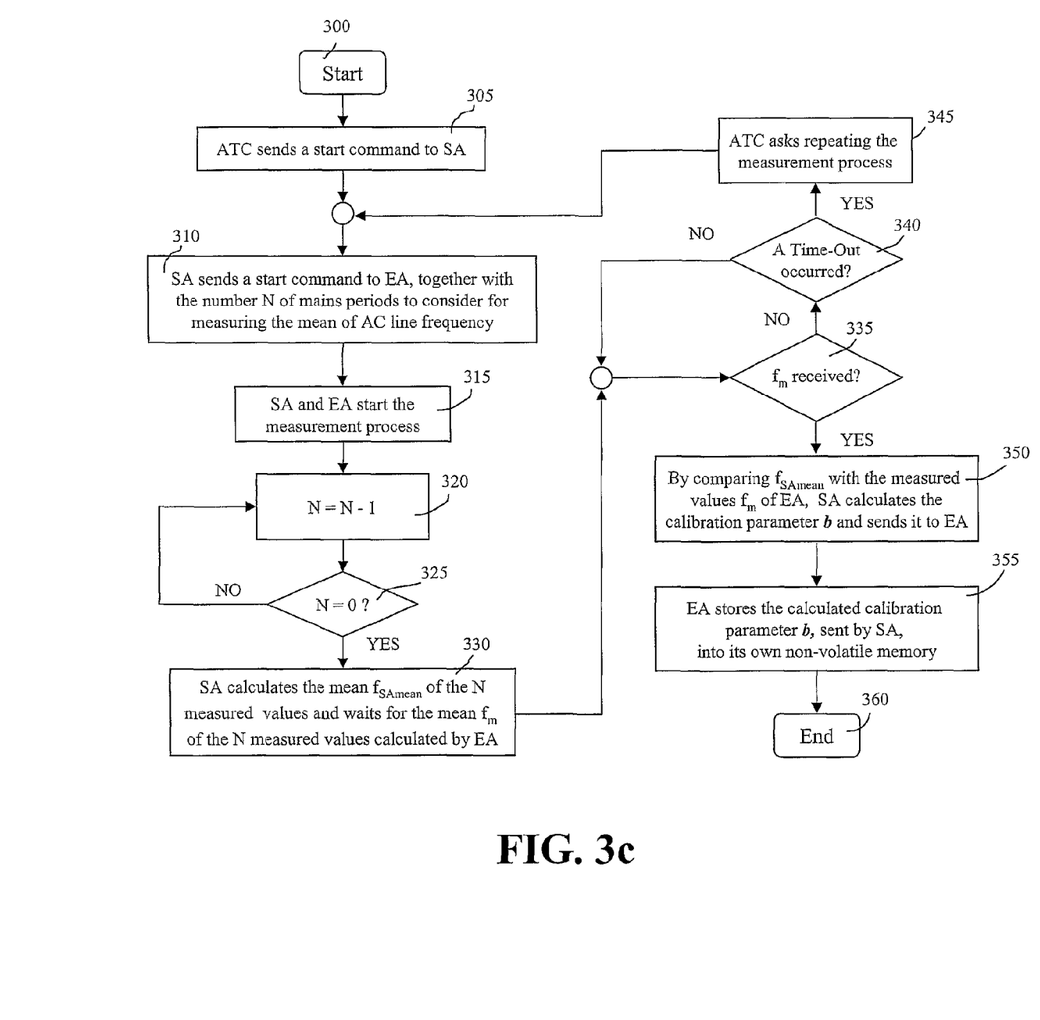
FIG. 3*c* is a flowchart that describes a third, particularly advantageous, mode of application of the aforesaid process according to the present invention.

A third variant of the calibration process according to the invention is finally described by the flowchart of FIG. 3c, where, with reference to the end-of-line testing architecture described in FIG. 1c, the function of calculation of the calibration coefficient b is performed by the same device SA, which performs also the function of standard instrument provided for rigorous measurement of the period of the a.c. mains voltage, and hence of the mains frequency, and is connected to the corresponding electrical household appliances EA (35) through the supply cable of the latter. In this case, it is the device SA that presides, according to the invention, over the process of calibration of the means for measurement of the mains period, and hence of the mains frequency, associated to the digital control system CS of the electrical household appliances EA (35).

Other variants of the calibration process are obviously possible, without thereby departing from the scope of the present invention.

To sum up, the calibration process forming the subject of the present invention, carried out once and for all, for example in the final phase (testing phase) of the process of production of the electrical appliances 35, or else upon end-of-production testing of the electronic card of the digital control system CS of said appliances, is distinguished by the following steps:

1) Measurement of the mean value of the mains frequency $f_{FMmean}$, performed within a given interval $T_N$ using an appropriate sample frequency meter 30, characterized by an accuracy compatible with the one required by the "Dynamic Demand Control" function, and simultaneous measurement, within the same interval $T_N$, of the mean frequency values $f_m1, f_m2, \ldots, f_mn$ by the control systems of the electrical appliances $35_{(1)}, 35_{(2)}, \ldots 35_{(n)}$, respectively.

2) Determination of the values of the calibration parameters bi (with i=1, 2, ..., n) for each of the "n" electrical appliances 35, calculated on the basis of the comparison of the corresponding mean frequency values $f_m1, f_m2, \ldots, f_mn$ with the mean frequency value $f_{FMmean}$ measured by the sampling device 30, where $bi = f_{FMmean}/f_m i$ (with the =1, 2, ..., n).

3) Storage of the values of the calibration parameters bi (b1, b2, ..., bn) determined in the previous step, for the individual electrical appliances 35, within the nonvolatile memory MEM of each of the respective digital control system CS of said electrical appliances.

As a consequence of the application of the method just described, the control system CS of each electrical appliance 35 will use, during normal operation of the product at the user's premises, the value of b stored in its own nonvolatile memory MEM, in order to correct the measurement of the mains frequency on the basis of the formula $f_{adjusted} = f_{measured}*b$.

In the case where the method forming the subject of the present invention is applied to the electronic part alone of the digital control system CS of the electrical appliance 35, the calibration process according to the invention is performed during functional testing of the digital control system itself. In this case, reference may be made, purely by way of non-limiting example, to a testing architecture of the type represented schematically in FIG. 1c, where each electrical appliance 35 is replaced by the respective digital control system CS.

A first highly advantageous application of the present invention regards refrigerators, in particular ones of low and medium range, which are characterized by large production volumes, but still use traditional control technologies of electromechanical type, or else are provided with highly economical digital control systems.

In the case of low-range refrigerators, the applicability of the present invention requires replacement of the traditional electromechanical thermostat with a digital control system of possibly comparable cost, hence one using a very economical microcontroller, typically without an external oscillator and consequently provided with a time base obtained from a rather imprecise internal oscillator. In this case, the imprecision in the measurement of the mains frequency, deriving from the fact that the time base is generated by the internal oscillator of the microcontroller of the control system of the fridge, is eliminated by means of the method forming the subject of the present invention, thus enabling implementation of the DDC function.

A similar consideration applies also to medium-range fridges, which, albeit already provided with digital control systems, adopt, however, low-cost microcontrollers that do not use an external (quartz or ceramic) oscillator, but use the function "internal oscillator" that is not suitable for performing the measurement of the mains frequency in a way compatible with the requirements of accuracy necessary for the DDC function. The application of the method forming the subject of the present invention enables the control system of the refrigerator, also in this case, to implement and manage the DDC function successfully.

A situation very similar to that of low-range fridges is that of electrical boilers, where the control of the temperature is typically managed by a electromechanical thermostat. Also in this case, in fact, the function of the boiler (which consists in maintaining the temperature of the water at a given value) can be performed with sufficient flexibility so as to meet the requirements of the DDC function, which can be implemented by replacing the mechanical thermostat with a low-cost electronic thermostat, the means for measurement of the mains frequency of which have been rendered suitable for the purpose through an operation of calibration according to the teachings of the present invention.

Other non-limiting examples of electrical appliances that can implement the DDC function benefiting from the teachings of the present invention are electrical household appliances such as washing machines and dish-washers, which, albeit not performing a continuous activity, like refrigerators and boilers, require, however, for their own operation a non-negligible amount of electrical power, above all in the step of heating of the water, and are provided with degrees of freedom sufficient for enabling their management in accordance with the requirements of the DDC function.

Other non-limiting examples finally regard air-conditioning systems, machines for drying linen and any other appliance or system of appliances that is capable of managing its own power absorption in a sufficiently flexible way to meet the requirements of the DDC function, implemented exploiting the advantages deriving from the teachings of the present invention.

The invention claimed is:

1. Method for measuring a frequency of an a.c. mains voltage that supplies an electrical appliance, particularly an appliance pre-arranged for varying in a dynamic way its own absorption of electrical power, the electrical appliance including an electronic control system that includes a detector, the method comprising the steps of:
   measuring, via the detector, a frequency value of the a.c. mains voltage; and
   calculating an adjusted frequency value by multiplying the frequency value measured by the detector via the control system with a correction parameter representing systematic errors of the detector read from a memory of the control system, wherein the correction parameter is calculated based on a first set of periods associated with the a.c. mains voltage and a second set of periods associated with the a.c. mains voltage.

2. The method according to claim 1, wherein the adjusted frequency value is a value that is not affected by said systematic errors.

3. The method according to claim 2, wherein the measured frequency value is obtained on a basis of a measurement of a period of the a.c. mains voltage or a detection of zero crossings of the a.c. mains voltage, and wherein the measurement of the period of the a.c. mains voltage comprises:
   generating a square wave, wherein a frequency of the square wave represents the frequency of the a.c. mains voltage; and
   measuring a time interval that lies between two given edges of the square wave.

4. The method according to claim 1, wherein the first set of periods are measured via the detector and the second set of periods are measured via a frequency meter coupled to the a.c. mains voltage.

5. The method according to claim 1, further comprising processing the adjusted frequency to dynamically control the electrical power absorption of the electrical appliance.

6. An electrical appliance comprising:
   at least one electrical load configured to be supplied with an a.c. voltage,
   wherein the electrical appliance is a connection to a network for supply of the a.c. voltage, and
   an electronic control system configured to manage said at least one electrical load, and configured to measure a value of a frequency of the a.c. voltage, the control system including,
      a memory configured to store a correction parameter associated with the frequency value, wherein the correction parameter is based on a first set of measured periods and a second set of measured periods, and
      at least one electronic microcontroller configured to correct the measured frequency value by multiplying the correction parameter with the measured frequency, in order to obtain a corrected frequency value that is not affected by systematic errors associated with the measured frequency value.

7. The electrical appliance according to claim 6, wherein the control system is further configured to dynamically vary power absorption associated with said at least one electrical load as a function of said corrected frequency value.

8. The electrical appliance according to claim 6 wherein the control system is further configured to measure a period of the frequency of the a.c. voltage, or detects zero crossings of the a.c. voltage and comprises a circuit arrangement including a transistor, a first resistor that applies the a.c. voltage to a base of the transistor, and a second resistor that obtains across a collector of the transistor a square wave having a frequency that represents the frequency of the a.c. voltage.

9. A method for dynamic control of electrical-power demand by an electrical appliance having at least one electrical load that is adapted to be supplied with an a.c. mains voltage, a means for connection to a network for supply of the a.c. voltage and an electronic control system configured to manage said at least one electrical load, the method comprising the operations of:
   i) measuring, via the control system, a frequency value of the a.c. mains voltage;
   ii) calculating a corrected frequency value based on the measured frequency value and correction parameter representing systematic errors of the measured frequency value of the a.c. mains voltage by reading the correction parameter from a memory of the control system, wherein the correction parameter is based on a first set of periods and a second set of periods associated with the a.c. voltage; and
   iii) varying power absorption associated with said at least one electrical load as a function of the corrected frequency value.

10. The method according to claim 9, wherein the operation of measuring comprises taking the measurement of the first set of periods and the second set of periods of the a.c. mains voltage, or the detection of zero crossings of the a.c. mains voltage.

11. A process for prearranging an electronic device for measuring a frequency of an a.c. voltage, the electronic device being of a type designed for connection to an a.c.-voltage electrical network and comprising a detector for detecting a value of the frequency of the a.c. mains voltage, the detector having a respective precision or resolution of measurement of frequency, the process comprising the steps of:
   i) electrically connecting the electronic device to the a.c.-voltage electrical network;
   ii) obtaining a first value being indicative of the frequency of the mains voltage, on a basis of at least one measurement performed via the detector of the electronic device;
   iii) obtaining a second value being indicative of the frequency of the a.c. mains voltage, on a basis of at least one measurement performed via a measuring device;

iv) calculating, on a basis of the first and second values being indicative of the frequency, a correction parameter associated with the frequency of the a.c. mains voltage, the correction parameter being in particular representative of systematic errors of the detector of the electronic device;

v) storing the value of the correction parameter in the electronic device; and vi) using the correction parameter for the purposes of correcting the first value being indicative of the frequency of the a.c. mains voltage performed via the respective detector means, wherein the steps i) to v) are performed in the course of the manufacturing process of the electronic device or in a testing step thereof.

12. The process according to claim 11, wherein at least one of said first and second values being indicative of the frequency is a mean value of a plurality of measurements of frequency, and step ii) comprises making, via the detector of the electronic device, a respective plurality of measurements of frequency and calculating a corresponding mean value, which constitutes said first value being indicative of the frequency.

13. The process according to claim 11, wherein step iii) comprises making, via the measuring device, a respective plurality of measurements of frequency and calculating a corresponding value, which constitutes said second value being indicative of the frequency.

14. The process according to claim 11, wherein the correction parameter is represented by a first ratio between said first and second values indicative of the frequency, or by a second ratio between said second and first values indicative of the frequency.

15. The process according to claim 11, wherein the correction parameter is stored in a non-volatile memory of the electronic device.

16. The process according to claim 11, wherein the electronic device and the measuring device are adapted to send and/or receive digital information through at least one communication network.

17. The process according to claim 11, wherein a central controller configured for sending and/or receiving digital information through at least one communication network, the central controller configured to:

send to the electronic device and to the measuring device information of control for start of the measurement of the frequency of the a.c. mains voltage and, following upon reception of said information of control, the electronic device starts a plurality of first measurements of the frequency of the a.c. mains voltage to produce first results and then calculates a first mean value of the results of the respective plurality of first measurements, and the measuring device starts a plurality of second measurements of the frequency of the a.c. mains voltage to produce second results and then calculates a second mean value of the second results of the respective plurality of second measurements.

18. The process according to claim 17 wherein the central controller sends to the electronic device and to the measuring device information indicating a number of periods of the a.c. mains voltage that must be considered for performing said plurality of first and second measurements.

19. The process according to claim 18, wherein:

the measuring device sends to the central controller the second mean value, and the central controller sends the second mean value to the electronic device, and the electronic device determines the correction parameter on the basis of the first and second mean values, and stores it in its memory.

20. The process according to claim 18, wherein:

the electronic device and the measuring device send the first and second mean values to the central controller, and the central controller determines the correction parameter on the basis of the first and second mean values, and sends it to the electronic device, which stores the correction parameter in its memory.

21. The process according to claim 17, wherein:

the central controller sends to the measuring device, via a first communication network, first control information for start of measurement of the frequency of the a.c. mains voltage and, following upon reception of the first control information, the measuring device sends to the electronic device, via a second communication network, second information for start of measurement of the frequency of the a.c. mains voltage.

22. The process according to claim 21, wherein the electronic device and the measuring device each carry out, synchronously, the plurality of first and second measurements of the frequency of the a.c. mains voltage, and then calculate the first and second mean values of the first and second results, with the electronic device sending to the measuring device the first mean value;

the measuring device determining the correction parameter on a basis of the second mean value calculated by the measuring device and the first mean value calculated by the electronic device, and the measuring device sending the correction parameter to the electronic device, which stores it in its memory.

* * * * *

UNITED STATES PATENT AND TRADEMARK OFFICE
CERTIFICATE OF CORRECTION

PATENT NO. : 8,248,057 B2
APPLICATION NO. : 12/522411
DATED : August 21, 2012
INVENTOR(S) : Valerio Aisa et al.

Page 1 of 1

It is certified that error appears in the above-identified patent and that said Letters Patent is hereby corrected as shown below:

Col. 1, line 40 should read: "order to ~~Prevent~~prevent any waste, to reduce the production of"

Col. 11, line 33 should read: "mean frequency value $f_{FMmean}$, calculated in a precise~~q~~ way"

Col. 14, line 21 should read: "the frequency of the a.c. voltage, or detects zero crossings of"

Col. 14, line 31 should read: "a.c. mains voltage and an electronic control system configured to"

Col. 14, line 37 should read: "measured frequency value and a correction parameter rep-"

Col. 14, line 43 should read: "a.c. mains voltage; and"

Col. 14, line 63 should read: "of the a.c. mains voltage, on a basis of at least one measure-"

Signed and Sealed this
Fourth Day of December, 2012

David J. Kappos
*Director of the United States Patent and Trademark Office*